Patented Aug. 23, 1949

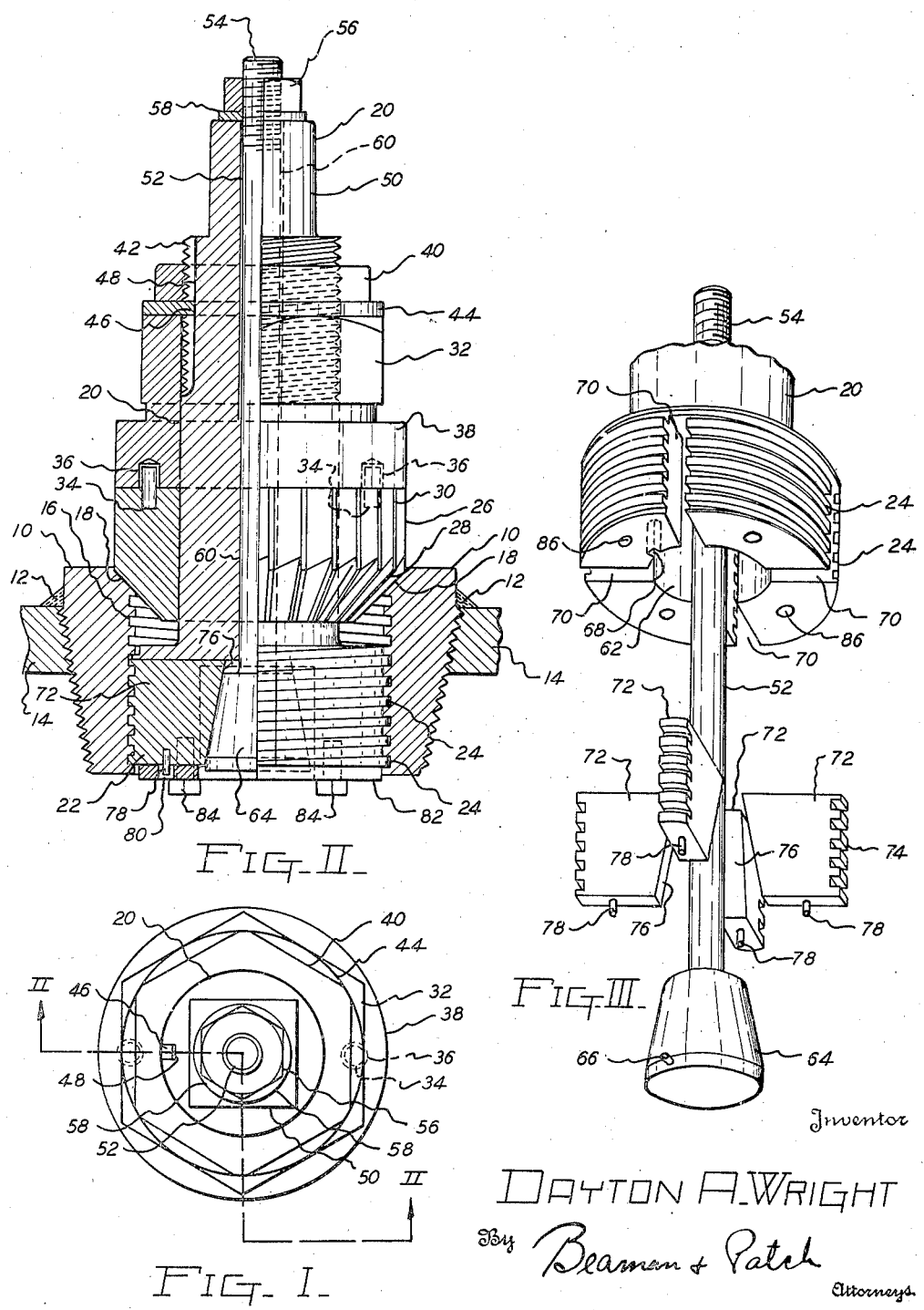

2,479,660

UNITED STATES PATENT OFFICE 2,479,660

COMBINATION CUTTER AND PILOT ADAPTER

Dayton A. Wright, Jackson, Mich.

Application January 25, 1947, Serial No. 724,435

3 Claims. (Cl. 77—73.5)

This invention relates to cutting tools used in cutting circular recessed surfaces in metals or other hard materials, and more particularly to the type of tools used in a cutting operation, when the operation must be performed with a high degree of accuracy.

My combination cutter and pilot adapter may be used in the cutting of many different sizes of holes or recesses in differing materials, although I have built it specifically for reseating the sealing surfaces in the bushings installed in a locomotive boiler, through which circular bushings the inside of the boiler may be cleaned. The bushings to which I have referred are circular in form, and are screwed into holes in the boiler plate of the locomotive, and thereupon welded into position so that they will not blow out under the steam pressures used in modern locomotives. The circular aperture defined by this bushing is closed by a threaded plug, a close or tight seal being obtained between the bushing and the threaded plug by means of a copper gasket which is roughly circular in section. This plug is known as the Huron plug, and has generally been standardized throughout the railroad industry. Reference may be had to Reissue Patent No. 17,445 for a description of the bushing, plug and seal accomplished by the Huron plug.

As part of the maintenance program of the railroads, each locomotive is periodically brought into a major repair shop, where it is torn down, cleaned out and generally put back into a condition approximating that in which it was received as a new engine. As a part of this reconditioning operation, all of the above-mentioned plugs are removed from the bushings and the inside of the boiler is cleaned out through the openings thus afforded. Due to causes beyond the scope of this description, the seating surfaces of the bushings become warped and corroded, and will not hold the steam pressure generated when the engine is put back in service. This necessitates a grinding or reseating operation on this seating surface, which reseating operation must be very accurately performed. If it were possible to remove the bushings each time this operation had to be performed, my tool would not be necessary, but since it is uneconomical to remove the bushings at the time the seat must be resurfaced, the operation is performed with the bushing in the boiler.

Previous to the development of the present improvement in tools herein disclosed, this reseating operation was performed with a tool bearing a somewhat similar cutting head, but that tool had several distinct disadvantages, among which it can be said that the seat as recut was not always centered with the pitch diameter or the pitch line of the thread or concentric to the bore of the hole in the bushing, and also these former tools had a tendency to drive on into the bushing during the cutting operation, thereby scoring the seat which was being surfaced, and ruining the bushing so that it had to be replaced.

It is an object of my invention to provide a cutting tool with a pilot adapter, which will cut the sealing surface in the above-described bushing in such a way that the seat is cut perfectly concentrically to the bore of the hole in the bushing being cut, and centered to the pitch diameter of the thread in the bushing.

A further object is to provide a tool which will perform the seating operation in a perfectly centered manner, while the tool is held securely in the hole of the bushing, so that it will not drive on further into the bushing.

A still further object is to provide a tool which will perform this centered reseating operation in a bushing in which the thread has become worn through use, especially in constructions in which threads are used which are not easily compensated for wear.

Further objects and advantages of my invention will appear from consideration of the following description, when considered in connection with the appended claims and the accompanying drawings, in which Fig. I is a top view of a tool constructed according to this invention, Fig. II is a vertical cross sectional view taken on line II—II of Fig. I, showing the tool in service, and Fig. III is an exploded view, with certain parts omitted, of the head of my tool and the parts which accomplish the objects set out above.

In the drawings, the bushing 10 is shown as welded as at 12 into boiler plate 14, and provided with an internal square thread 16, which form of thread is not easily compensated for wear. The frustoconical surface 18 is the sealing surface which must be reseated in order to allow a pressure tight fit between the plug (not shown) and the bushing 10.

In order to accomplish the reseating operation, I have provided a pilot mandrel 20 fitted with a square threaded head portion 22, the square thread 24 on the head portion 22 being cut to engage the square thread 16 in the bushing 10 as the head portion 22 is screwed into the bushing 10. Slidably received on the mandrel 20 is the cutter 26, which I have constructed with cutting edges 28 at an angle to cut the frustoconical surface 18 as well as cutting edges 30 parallel to the axis of the mandrel. This will assure that the cut is uniform and parallel to the axis of the mandrel or the bore of the bushing after wear has taken place on the conical cutting edges 28. To provide a driving relation between cutter 26 and the hex nut 32 used for revolving the cutter, I use a pair of pins 34 projecting out of the top surface of cutter 26, and received in the hole 36 in the under surface of the driving portion 38, a part of which is shaped to form hex nut 32. It is apparent from Fig. I that the cutter 26 and the driving portion 38 are received on mandrel 20 with a slip fit and are free to rotate on mandrel 20, concentric to the axis. It is also apparent from Fig. II that if a wrench is applied to the hex nut 32 and the nut is revolved, the cutter 26 will revolve and it will perform a cutting operation on surface 18 in the bushing 10.

In order to govern the size or depth of the cut being taken by cutting edge 28 of the cutter 26, which is determined in part by the pressure with which cutter 26 is held against surface 18, a threaded feed nut 40 cooperating with threads 42 on pilot mandrel 20 is supplied to give an adjustable pressure, by means of which cutter 26 may be forced against the surface 18. To prevent the turning and tightening down of threaded feed nut 40 during rotation of hex nut 32, a keyed washer 44 is inserted between hex nut 32 and feed nut 40; the key portion 46 being allowed to slide up and down in slot or key way 48 in threaded portion 42 of mandrel 20, thereby preventing any turning of key washer 44 in relation to mandrel 20. The top portion 50 of mandrel 20 is squared to permit the turning of the head 22 into the bore of the bushing 10, prior to the tools being used.

The draw bolt 52 is provided at one end with threads 54, draw bolt nut 56 and a suitable washer 58, which fits between draw bolt nut 56 and squared portion 50 of pilot mandrel 20. An axial bore 60 is provided in mandrel 20 to receive the bolt 52 with the bore having an enlargement 62 at its lower end to receive the frustoconical head 64 of the bolt 52. Head 64 is fitted with a small projecting pin 66 which rides in slot 68 in head 22, thereby preventing rotation of draw bolt 52 when nut 56 is being turned at the opposite end of the draw bolt.

The head 22 of mandrel 20 is constructed with four slots 70, perpendicular to each other and parallel to the axis of the mandrel 20. Radially adjustable segments 72 are formed to slide in the slots 70 and and approximate the depth thereof. I have found in constructing this tool that slots 70 should be machined in the tool prior to cutting threads 24 on head 22; after the slots 70 are machined in head 22, the radial segments 72 are inserted in the head 22 and the threads 24 and threads 74 on segments 72 are then machined, all in one operation, thereby giving the same thread or matching threads to both head 22 and segments 72. In order to conduct this threading operation in this manner, it is necessary that the camming surfaces 76 on the segments 72 shall already have been cut and finished, so that the segments 72 will have assumed a centered position before threads 24 and 74 are cut in head 22 and segments 72. As will be seen from Fig. III, each of the segments 72 is provided with a small pin 78 which projects from the bottom surface of segment 72, and which rides in a slot 80 in the retainer plate 82. The retainer plate 82 serves to guide the lower surfaces of segments 72, and, through the engagement of pins 78 in slots 80, it prevents the segments 72 from dropping out of slots 70 when the tool is not in use. The retainer plate 82 is held onto pilot head 22 by means of screws 84 which are threaded into holes 86 in the lower surface of head 22.

In operation it is best to remove feed nut 40, key washer 44, driving portion 38 and cutter 26 from the mandrel 20 before the pilot mandrel 20 is placed in position, since the tool is quite heavy and should be perfectly centered before the operation is begun. With the remaining parts in position, the pilot head 22 is screwed into the bore of the bushing 10 so that the head 22 is well below the top surface of the bushing 10. With this much of the tool in this position, nut 56 on draw bolt 52 is tightened, which, by the action of the frustoconical surface 64 on camming surfaces 76 of the segments 72 cams segments 72 away from the axis of the bore of the bushing 10 a slight distance. I have found that this camming action only amounts to a very few thousandths of an inch, but, since the camming is equal on all of the four radial segments 72, the draw bolt 52 is thereby centered concentric with the bore of the bushing 10, even though a slight amount of wear of the thread 16 has slightly changed the position of the axial center of the bore of the bushing 10. This will likewise center the mandrel 20 in the bore of the bushing 10, due to the close fit between draw bolt 52 and the axial hole 60 in the mandrel 20. With the radial segments 72 expanded in this manner, it will likewise be found that the pilot head 22 is locked in position in the bushing 10, the security of which locking may be entirely controlled by the amount of tightening of nut 56 on the draw bolt 52. Following this positioning and centering of the mandrel 20, cutter portion 26 is placed over the mandrel 20 and up against surface 18, followed by driving portion 38, key washer 44, and the feed nut 40. With these parts in position, a wrench is used to turn hex nut 32, thereby performing the cutting operation. As soon as the cutting begins to run easy, feed nut 40 is tightened slightly, thereby moving the cutters 26 further against surface 18 and causing a further cut to be taken. After the cutting has been completed, the tool may be removed either by disassembling and removing the cutter portions, or by merely loosening nut 56 on draw bolt 52, after which squared portions 50 of the pilot mandrel 20 may be turned, unscrewing pilot head 22 from the bore of bushing 10.

The test of a tool is, briefly, whether or not it will do the job for which it is designed. I have found that by using my tool, it is possible to perfectly reseat the sealing surface 18 in one operation. During the course of the development of my tool, several hundred of these bushings were reseated as a part of the reconditioning of various locomotives. Following such reseatings, the normal plug was inserted in the bushing and tightened down with the usual copper gasket, seating against surface 18. In no case was it found, after water had been placed in the boilers and the boiler fired to operating steam pressure, that any water leaked through the seal thus made between the plug and the bushing.

I recognize that my tool can be used in various sorts of reseating operations in differing materials, and that either a larger or smaller number of expanding radial segments may be used to perform the centering operation which is necessary to the success of the use of the tool. However, these minor changes can be made without departing from the spirit of my invention as herein disclosed.

Having thus described my invention, what I claim as new and desire to protect by Letters Patent is:

1. A reamer centering device for an annular reaming tool and adapted for insertion through an opening in a workpiece comprising in combination, a centering pilot head adapted to have piloted engagement with the said opening and itself having a central opening and transverse slots open both to the said head opening and to the outer periphery of the head, a sleeve fixedly associated with said head and extending from one end of the latter in the direction of the surface to be operated upon, said sleeve, central opening and surface being all co-axial and the sleeve forming on the exterior a bearing support for the rotary annular reaming tool, a plurality of segments located one in each said slot and adapted completely to fill the latter, the outer peripheral surfaces of said segments being complementary to the outer peripheral surface portions of the head and forming therewith a solid wall, the inner ends of said segments extending into said pilot head opening, a segment expander head in the latter adapted to engage the inner ends of the segments to exert outward pressure thereagainst, an extension on said expander head and slidably extending through the sleeve to the end of the latter remote from the pilot head, and means engageable with said extension at its said remote end and adapted for actuation to force the expander head into operative position in which it exerts the outward pressure upon the said segments which is required to enable the pilot head and sleeve to be immovably located within the workpiece opening during the reaming operation.

2. A reamer centering device as claimed in claim 1 wherein said sleeve has an exterior screw-threaded portion remote from the pilot head, and a nut is provided for engagement with said screw-threaded portion to hold the reaming tool in its operating position against said surface.

3. A reamer centering device as claimed in claim 1 wherein said pilot head has a screw-threaded exterior surface adapted for engagement with a correspondingly screw-threaded workpiece opening containing the surface to be operated upon.

DAYTON A. WRIGHT.

REFERENCES CITED

The following references are of record in the file of this patent:

UNITED STATES PATENTS

| Number | Name | Date |
|---|---|---|
| 80,560 | Nagle | Aug. 4, 1868 |
| 648,394 | Danley | May 1, 1900 |
| 981,227 | Schwartz | Jan. 10, 1911 |
| 1,166,049 | Hyde | Dec. 28, 1915 |
| 1,360,444 | Roline et al. | Nov. 30, 1920 |
| 1,748,126 | Hall | Feb. 25, 1930 |
| 2,284,768 | Ramsdell | June 2, 1942 |

FOREIGN PATENTS

| Number | Country | Date |
|---|---|---|
| 11,741 | Great Britain | May 15, 1911 |
| 362,413 | Germany | Mar. 15, 1914 |